(12) United States Patent  
Niwa

(10) Patent No.: US 12,319,159 B2  
(45) Date of Patent: Jun. 3, 2025

(54) CHARGING DEVICE

(71) Applicant: DENSO CORPORATION, Kariya (JP)

(72) Inventor: Masato Niwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 607 days.

(21) Appl. No.: 17/713,650

(22) Filed: Apr. 5, 2022

(65) Prior Publication Data

US 2022/0227244 A1  Jul. 21, 2022

Related U.S. Application Data

(63) Continuation of application No. PCT/JP2020/036368, filed on Sep. 25, 2020.

(30) Foreign Application Priority Data

Oct. 16, 2019 (JP) ................. 2019-189699

(51) Int. Cl.
*H02J 7/00* (2006.01)
*B60L 53/14* (2019.01)

(52) U.S. Cl.
CPC .......... *B60L 53/14* (2019.02); *H02J 7/00714* (2020.01); *H02J 7/00304* (2020.01)

(58) Field of Classification Search
USPC ....................................................... 320/109
See application file for complete search history.

(56) References Cited

U.S. PATENT DOCUMENTS

| 9,142,975 B2* | 9/2015 | Mori ................... H01M 10/425 |
| 10,933,762 B2* | 3/2021 | Satake .................... B60K 6/22 |
| 2013/0241486 A1 | 9/2013 | Tomokage et al. |
| 2018/0301983 A1 | 10/2018 | Okazaki et al. |

FOREIGN PATENT DOCUMENTS

| JP | 2013-230053 A | 11/2013 |
| JP | 2015-070627 A | 4/2015 |
| JP | 2019-106770 A | 6/2019 |
| WO | 2019/117023 A1 | 6/2019 |

* cited by examiner

*Primary Examiner* — Samuel Berhanu
(74) *Attorney, Agent, or Firm* — Oliff PLC

(57) ABSTRACT

A charging device includes: a relay cable having one end connected to a charging connector; a battery charged by a direct current supplied from the charging connector; a battery cable having one end connected to the battery; a charging connection portion connected to the other end of the relay cable; a battery connection portion connected to the other end of the battery cable; a relay that switches the direct current to be supplied or not relative to the battery; and a housing arranged between the battery and the charging connector so as to house the relay. The charging connection portion is arranged on the housing adjacent to the charging connector, and the battery connection portion is arranged on the housing adjacent to the battery.

5 Claims, 4 Drawing Sheets

CHARGING DEVICE

CROSS REFERENCE TO RELATED APPLICATION

The present application is a continuation application of International Patent Application No. PCT/JP2020/036368 filed on Sep. 25, 2020, which designated the U.S. and claims the benefit of priority from Japanese Patent Application No. 2019-189699 filed on Oct. 16, 2019. The entire disclosures of all of the above applications are incorporated herein by reference.

TECHNICAL FIELD

The present disclosure relates to a charging device for a vehicle.

BACKGROUND

In an electric vehicle or hybrid vehicle, a charging connector is connected to a power supply cable outside the vehicle, such that an in-vehicle battery can be charged by supplying DC power from outside of the vehicle.

SUMMARY

According to a first aspect of the present disclosure for achieving the object, a charging device for a vehicle includes: a charging connector connected to a power supply cable outside the vehicle; a relay cable arranged inside the vehicle, the relay cable having one end connected to the charging connector; a battery charged by a direct current supplied from the charging connector; a battery cable having one end connected to the battery; a charging connection portion connected to the other end of the relay cable; a battery connection portion connected to the other end of the battery cable; a relay that switches the direct current to be supplied or not relative to the battery; and a housing arranged between the battery and the charging connector so as to house the relay. The charging connection portion is arranged on the housing adjacent to the charging connector, and the battery connection portion is arranged on the housing adjacent to the battery.

DESCRIPTION OF EMBODIMENTS

Figure 1:
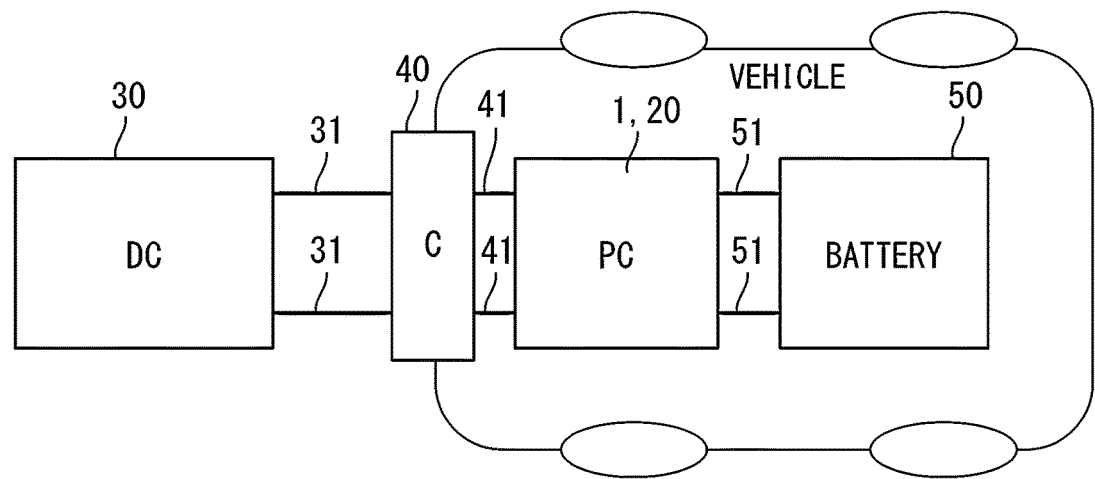
FIG. 1 is a diagram showing a power conversion device, a vehicle, and a charging device according to the present disclosure.

To begin with, examples of relevant techniques will be described.

In an electric vehicle or hybrid vehicle, an in-vehicle battery can be charged by supplying DC power from outside of the vehicle. This type of vehicle includes a charging connector that is connected to a power supply cable outside the vehicle, and a charging device that switches the DC power to be supplied or not from the charging connector to the battery.

The charging device is mounted on the vehicle. The charging device has a housing, a charging connection portion connected for charging, and a battery connection portion connected to the battery via a battery cable. In the vehicle, the charging device may be arranged between the charging connector and the battery. In that case, in the charging device, if the charging connection portion and the battery connection portion are provided adjacent to the charging connector of the housing, the length of the battery cable along the charging device may become long. If the length of the battery cable is long, the influence of power loss may be large during quick charging when a large current needs to be passed.

The present disclosure provides a charging device capable of reducing the influence of power loss during the quick charging.

According to a first aspect of the present disclosure for achieving the object, a charging device for a vehicle includes: a charging connector connected to a power supply cable outside the vehicle; a relay cable arranged inside the vehicle, the relay cable having one end connected to the charging connector; a battery charged by a direct current supplied from the charging connector; a battery cable having one end connected to the battery; a charging connection portion connected to the other end of the relay cable; a battery connection portion connected to the other end of the battery cable; a relay that switches the direct current to be supplied or not relative to the battery; and a housing arranged between the battery and the charging connector so as to house the relay. The charging connection portion is arranged adjacent to the charging connector in the housing, and the battery connection portion is arranged adjacent to the battery in the housing.

In the configuration of the first aspect, the charging connection portion is arranged adjacent to the charging connector in the housing, and the battery connection portion is arranged adjacent to the battery in the housing. Therefore, it is possible to restrict the length of the relay cable and the battery cable from becoming longer as compared with a case where the charging connection portion and the battery connection portion are provided on the same surface of the housing. Therefore, in the configuration of the above aspect, the influence of power loss due to the cable can be reduced at the time of charging.

Hereinafter, multiple embodiments of the present disclosure will be described with reference to the drawings. In the following description, the same reference symbols are assigned to corresponding components in each embodiment in order to avoid repetitive descriptions. In each embodiment, when only a part of the configuration is described, the corresponding parts of the configuration described in other embodiments may be applied to the remaining part of the configuration. In addition to the combinations of configurations specifically shown in various embodiments, the configurations of various embodiments can be partly combined even if not explicitly suggested, unless such combinations are contradictory. It should be understood that the unexplained combinations of the structural components recited in the following embodiments and modifications thereof are assumed to be disclosed in this description by the following explanation.

First Embodiment

FIG. 1 is a diagram showing a configuration of a power conversion device 1 (PC) according to the present disclosure, a battery 50 arranged inside a vehicle, and a DC power supply device 30 (DC) outside the vehicle. The DC power supply device 30 is connected to a charging connector 40 (C) provided in the vehicle by a power supply cable 31. The charging connector 40 is connected to the power conversion device 1 by a relay cable 41 distributed inside the vehicle. The power conversion device 1 is connected to the battery 50 by a battery cable 51. With the above configuration, the DC power supply device 30 is connected to the battery 50 via the power conversion device 1.

Figure 2:
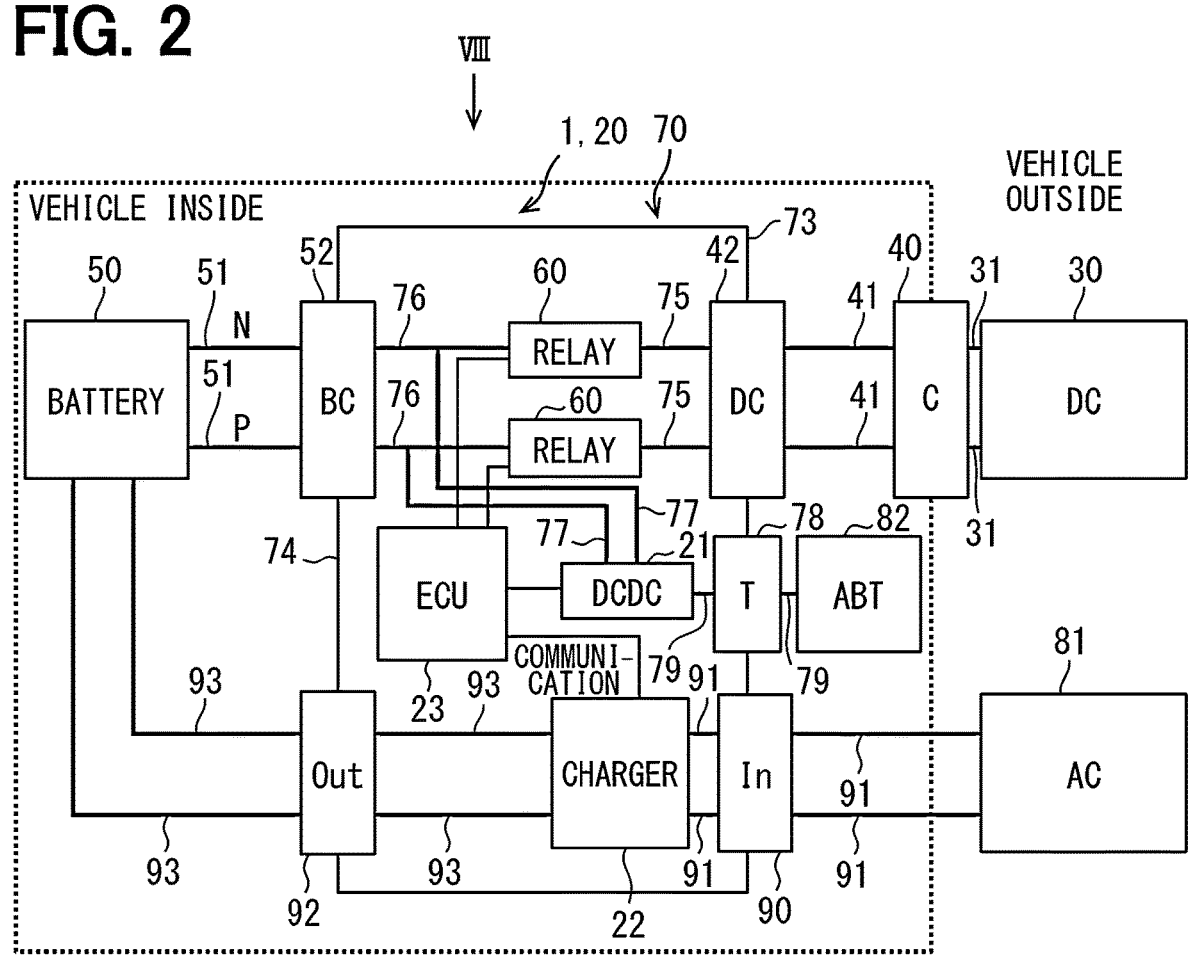
FIG. 2 is a diagram showing a configuration of the power conversion device according to the present disclosure.

FIG. 2 shows an example of the power conversion device 1 including the charging device 20 of the present disclosure. The power conversion device 1 disclosed in FIG. 2 includes a housing 70, a relay 60, a DCDC converter 21, a charger 22, and an ECU 23. The power conversion device 1 is connected to the charging connector 40 via the relay cable 41, and is connected to the battery 50 via the battery cable 51.

More specifically, there is a relay cable 41 having one end connected to the charging connector 40. The other end of the relay cable 41 is connected to an input conductive member 75 by a charging connection portion 42 (DC) of the housing 70 located adjacent to the charging connector 40. The charging connection portion 42 may have a fixing part such as fastening, to connect the relay cable 41 and the input conductive member 75, or the relay cable 41 and the input conductive member 75 may come into contact with each other by fitting the resin connectors to each other. With the above configuration, the power conversion device 1 and the charging connector 40 are connected. Further, the charging connection portion 42 is connected to the relay 60 housed in the housing 70 of the power conversion device 1 via the input conductive member 75.

The battery cable 51 has one end connected to the battery 50 and the other end connected to an output conductive member 76 by a battery connection portion 52 (BC). The battery connection portion 52 is arranged on the housing 70 adjacent to the battery. The battery connection portion 52 may have a fixing part such as fastening, to connect the battery cable 51 and the output conductive member 76, or the battery cable 51 and the output conductive member 76 may come into contact with each other by fitting the resin connectors to each other. The battery connection portion 52 is connected to the relay 60 housed in the housing 70 via the output conductive member 76. With the above configuration, the power conversion device 1 and the battery 50 are connected. Further, according to the above configuration, the power conversion device 1, the charging connector 40 and the battery 50 are connected via the relay cable 41, the charging connection portion 42, the input conductive member 75, the relay 60, the output conductive member 76, the battery connection portion 52 and the battery cable 51.

From the above configuration that the charging connector 40 is connected to the DC power supply device 30, the electric power input from the DC power supply device 30 is supplied to the battery 50 via the power conversion device 1.

In FIG. 2, the power conversion device 1 includes the DCDC converter 21 housed in the housing 70. The DCDC converter 21 is connected to the output conductive member 76 via the DCDC conductive member 77. With the above configuration, the DCDC converter 21 is connected to the battery 50. Further, the DCDC converter 21 is connected to the auxiliary battery 82 (ABT) via the terminal 78 (T) and the auxiliary conductive member 79. With the above configuration, the battery 50 is connected to the auxiliary battery 82 via the DCDC converter 21.

In FIG. 2, the power conversion device 1 includes the charger 22 housed in the housing 70. The charger 22 is connected to the battery 50 via the AC output connector 92 (Out) and the AC output conductive member 93. Further, the charger 22 is connected to the AC power supply device 81 (AC) via the AC input connector 90 (In) and the AC input conductive member 91. With the above configuration, the battery 50 is connected to the AC power supply device 81 via the charger 22.

In FIG. 2, the power conversion device 1 includes the ECU 23 housed in the housing 70. The ECU 23 is communicably connected to the relay 60, the DCDC converter 21, and the charger 22.

In the power conversion device 1, a portion related to charging the battery 50 from the DC power supply device 30 is referred to as a charging device 20.

Figure 3:
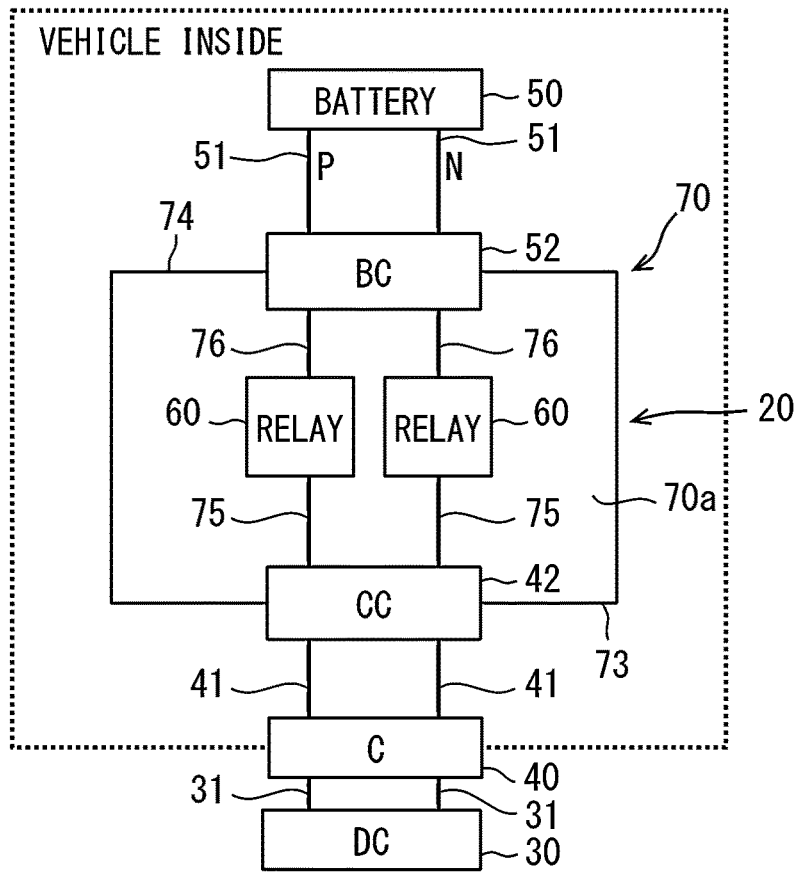
FIG. 3 is a diagram showing a configuration of a charging device according to a first embodiment of the present disclosure.

FIG. 3 is a diagram showing the configuration of the charging device 20 in the first embodiment of the present disclosure. The charging device 20 includes the housing 70, the charging connection portion 42, the battery connection portion 52, and the relay 60. In the above configuration, the housing 70 is arranged between the battery 50 and the charging connector 40. The charging connection portion 42 is arranged on the housing 70 adjacent to the charging connector, and the battery connection portion 52 is arranged on the housing 70 adjacent to the battery.

In the present disclosure, the housing 70 is arranged between the battery 50 and the charging connector 40. Specifically, at least a part of the housing 70 is located in a region where the battery 50 and the charging connector 40 are connected by a straight line. In FIG. 3, the housing 70 has an input surface 73 on which the charging connection portion 42 is arranged and an output surface 74 on which the battery connection portion 52 is arranged. The input surface 73 and the output surface 74 oppose each other through the housing 70.

As shown in FIG. 3, the housing 70 has a rectangular surface 70a having a pair of long sides and a pair of short sides. The input surface 73 is connected to one of the pair of long sides of the rectangular surface 70a, and the output surface 74 is connected to the other of the pair of long sides.

Figure 4:
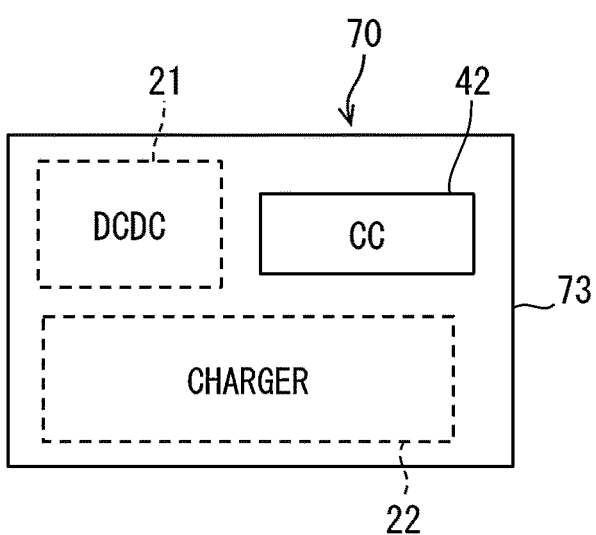
FIG. 4 is a modification of the first embodiment of the present disclosure.

FIG. 4 is a modification of the first embodiment, in which the DCDC converter 21 and the charger 22 are housed in the housing 70 of the charging device 20. FIG. 4 is a view in which the charging connection portion 42 is viewed from the charging connector in one direction orthogonal to the input surface 73. In the above configuration, at least a part of the charging connection portion 42 and the battery connection portion 52 overlap each other. In FIG. 4, since the charging connection portion 42 is arranged at a position completely overlapping the battery connection portion 52, the battery connection portion 52 does not appear on the drawing.

When the charging connection portion 42 is viewed in the same manner as described above, the DCDC converter 21 is arranged so as not to overlap the charging connection portion 42. Further, in case where the charger 22 is provided in the housing 70, the charger 22 is arranged so as not to overlap when the charging connection portion 42 is viewed in the same manner as described above.

Figure 5:
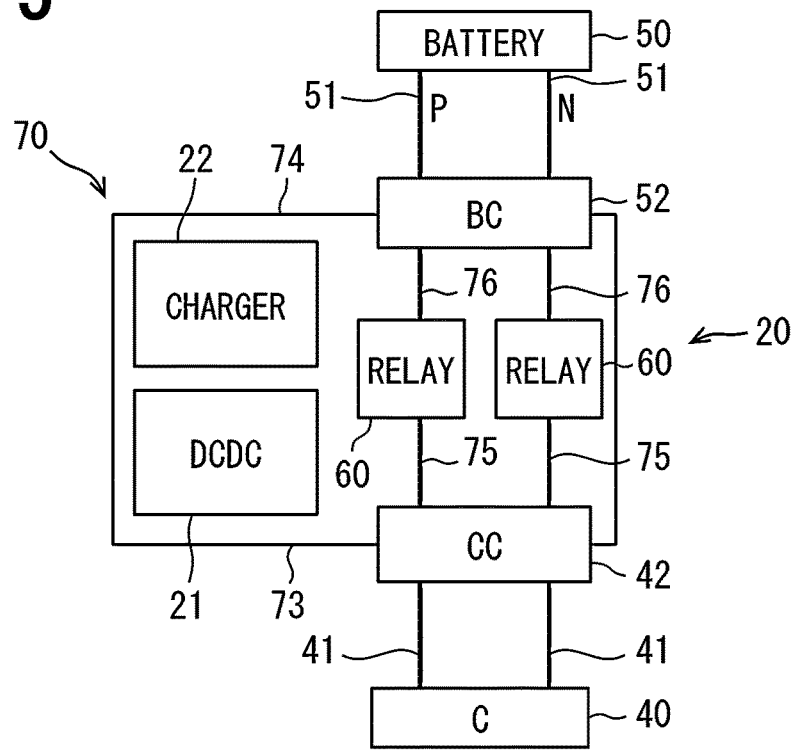
FIG. 5 is a modification of the first embodiment of the present disclosure.

FIG. 5 is a diagram showing a modification of the first embodiment. When the housing 70 is viewed from the upper side, the charger 22 and the DCDC converter 21 are arranged at different positions from the charging connection portion 42 in a width direction perpendicular to the one direction and the up-down direction. Similarly, the charger 22 and the DCDC converter 21 are arranged at different positions from the battery connection portion 52 in the width direction.

More preferably, the charging connection portion 42 and the battery connection portion 52 are attached to the housing 70 in one side area in the width direction with respect to the center of the housing 70. The DCDC converter 21 and the charger 22 are arranged in the other side area in the width direction with respect to the center of the housing 70.

In the above configuration, it is desirable that the relay 60 overlaps at least a part of the range where the charging connection portion 42 and the battery connection portion 52 are located in the width direction. More preferably, it is desirable that the charging connection portion 42 and the battery connection portion 52 are arranged at positions to completely overlap each other in the width direction. Further, it is desirable that the input conductive member 75 and the output conductive member 76 are arranged so as to be aligned in a straight line.

It is desirable that at least a part of the charging connection portion 42 overlaps with the charging connector 40 in the width direction. It is desirable that at least a part of the battery connection portion 52 overlaps with the battery 50 in the width direction.

The input conductive member 75 and the output conductive member 76 are flexible conductive members such as harnesses or bus bars.

Figure 8:
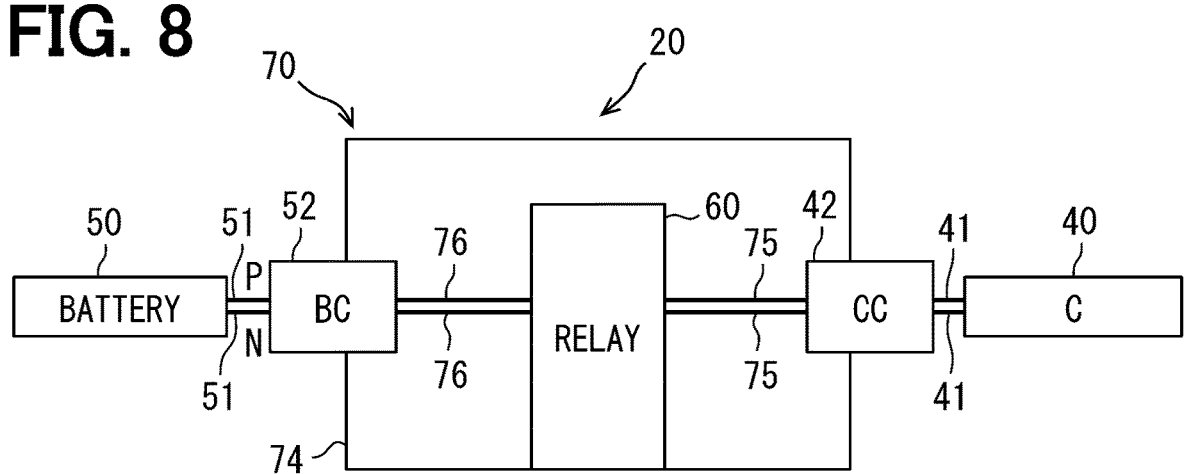
FIG. 8 is a view seen in an arrow direction VIII in FIG. 2.

As shown in FIG. 8, it is preferable that the battery 50, the battery connection portion 52, the relay 60, the charging connection portion 42, and the charging connector 40 are arranged at a height at which at least a part thereof overlap with each other in the up-down direction. Further, it is desirable that the battery cable 51, the output conductive member 76, the input conductive member 75, and the relay cable 41 are arranged in a straight line perpendicular to the up-down direction.

According to the present embodiment, the power conversion device 1 has the charger 22. The charger 22 is supplied with AC power from an AC power supply device 81 that obtains power from a household power source or the like via an AC input conductive member 91 and an AC input connector 90. The charger 22 converts the AC power supplied from the AC power supply device 81 into DC power. After converting to DC power, the charger 22 supplies DC power to the battery 50 via the AC output conductive member 93 and the AC output connector 92 to charge the battery 50. In the present disclosure, the charging of the battery 50 performed by the AC power supply device is referred to as normal charging.

The power conversion device 1 has the DCDC converter 21. Power is supplied to the DCDC converter 21 from the battery 50 via the battery cable 51, the battery connection portion 52, the output conductive member 76, and the DCDC conductive member 77. The DCDC converter 21 converts the electric power supplied from the battery 50. After the conversion, the DCDC converter 21 supplies the converted electric power to the auxiliary battery 82 via the auxiliary conductive member 79 and the terminal 78 to charge the auxiliary battery.

The power conversion device 1 has the relay 60. In the above configuration, when power is supplied to the battery 50 from the DC power supply device 30 installed in the charging station or the like, the DC power is supplied to the battery 50 via the relay 60. In the present disclosure, the charging performed from the DC power supply device 30 to the battery 50 is referred to as quick charging. The relay 60 connects or disconnects a conductive member and a cable for connecting or disconnecting the DC power supply device 30 and the battery 50.

In the above configuration, the power conversion device 1 has the ECU 23. The ECU 23 is connected to communicate with the relay 60, the DCDC converter 21, and the charger 22. In the above configuration, the ECU 23 controls the operation of the relay 60, the DCDC converter 21, and the charger 22.

According to the present embodiment, as shown in FIG. 3, the charging connection portion 42 is attached to the housing 70 adjacent to the charging connector 40. In the above configuration, the charging connector 40 and the charging connection portion 42 can be brought closer to each other as compared with a case where the charging connection portion 42 is arranged adjacent to the battery 50.

In the above configuration, the battery connection portion 52 is arranged on the housing 70 adjacent to the battery 50. In the above configuration, the battery 50 and the battery connection portion 52 can be brought closer to each other as compared with a case where the battery connection portion 52 is arranged adjacent to the charging connector 40.

With the above configuration, it is possible to restrict the length of the relay cable 41 connecting the charging connector 40 and the charging connection portion 42 from becoming long. Similarly, it is possible to suppress an increase in the length of the battery cable 51 that connects the battery 50 and the battery connection portion 52.

When the lengths of the relay cable 41 and the battery cable 51 are shortened, the resistance of the relay cable 41 and the battery cable 51 is reduced. When the resistance is reduced, the power loss due to the relay cable 41 and the battery cable 51 is reduced.

The magnitude of the direct current flowing during the quick charging is larger than the magnitude of the alternating current flowing through the conductive member during normal charging. When a large current flows through the conductive member, the influence of power loss due to heat or the like becomes large. Therefore, there is a possibility that the influence of power loss will be large, especially at the time of quick charging in which a direct current is passed. Therefore, a configuration that can reduce the influence of power loss by suppressing increase in the length of the conductive member as in the above configuration is particularly effective at the time of quick charging. Therefore, in the above configuration, the charging efficiency of the battery 50 can be improved at the time of quick charging.

In the above configuration, the housing 70 is arranged between the charging connector 40 and the battery 50. Further, the charging connection portion 42 is arranged on the housing 70 adjacent to the charging connector, and the battery connection portion 52 is arranged on the housing 70 adjacent to the battery 50. Therefore, in the above configuration, it is possible to restrict the battery 50 from being arranged between the charging connector 40 and the housing 70. Contrary to the above configuration, in case where the battery 50 is arranged between the housing 70 and the charging connector 40, the length of the relay cable 41 may be increased by the size of the battery 50. According to the present embodiment, since the battery 50 can be suppressed from being arranged between the housing 70 and the charging connector 40, it is possible to suppress the length of the relay cable 41 from becoming long. Therefore, in the above configuration, the influence of the power loss at the time of quick charging of the battery 50 can be reduced.

In FIG. 3, the charging connector 40 is located on the front side of the vehicle, and at least a part of the battery 50 is located on the rear side of the vehicle. In the above configuration, a direction in which the charging connector 40 and the charging device 20 face each other is the same as a direction in which the battery 50 and the charging device 20 face each other. In the charging device 20 of FIG. 3, the input surface 73 and the output surface 74 are surfaces of the housing 70 opposing each other. When the charging device having the above configuration is mounted on the vehicle, the input surface 73 can be arranged adjacent to the charging connector 40. Similarly, in the above configuration, the output surface 74 can be arranged adjacent to the battery 50. With the above configuration, the charging connection portion 42 can be arranged adjacent to the charging connector 40 and the battery connection portion 52 can be arranged adjacent to the battery 50. Therefore, with the above configuration, it is possible to restrict the lengths of the relay cable 41 and the battery cable 51 from becoming long. Therefore, in the above configuration, the influence of the power loss at the time of quick charging of the battery 50 can be reduced.

In the above configuration, as shown in FIG. 3, the housing 70 includes the rectangular surface 70a having a pair of long sides and a pair of short sides. The input surface 73 is connected to one of the pair of long sides of the rectangular surface 70a, and the output surface 74 is connected to the other of the pair of long sides. According to the above configuration, the charging connection portion 42 and the battery connection portion 52 are arranged in the same direction as the one direction. Therefore, in the above configuration, the distance between the charging connection portion 42 and the battery connection portion 52 is about the same as the length of the short side of the housing 70. That is, the total length of the input conductive member 75 and the output conductive member 76, which connects the charging connection portion 42 and the battery connection portion 52, is about the same as the length of the short side of the housing 70.

Contrary to the above configuration, in case where the input surface 73 and the output surface 74 are arranged on the short side of the housing 70, the charging connection portion 42 and the battery connection portion 52 are arranged so as to be aligned in the same direction as the extending direction of the long side of the housing 70. Therefore, the distance between the charging connection portion 42 and the battery connection portion 52 is about the same as the length of the long side of the housing 70. That is, the total length of the input conductive member 75 and the output conductive member 76 is about the same as the length of the long side of the housing 70.

Therefore, in the above configuration, it is possible to restrict the lengths of the input conductive member 75 and the output conductive member 76 from becoming longer, compared with a case where the input surface 73 and the output surface 74 are arranged on the long side of the housing. Therefore, in the above configuration, the influence of the power loss due to the conductive member at the time of quick charging of the battery 50 can be reduced.

In the above configuration, when the charging connection portion is viewed from the charging connector 40 in the one direction, at least a part of the charging connection portion 42 and the battery connection portion 52 overlap each other. Contrary to the above configuration, in a case where the charging connection portion 42 and the battery connection portion 52 do not overlap when the charging connection portion 42 is viewed in the same manner as described above, the distance between the charging connection portion 42 and the battery connection portion 52 becomes longer in the up-down direction and the width direction as compared with the above configuration. That is, there is a possibility that the lengths of the input conductive member 75 and the output conductive member 76 become long.

Therefore, in the above configuration, it is possible to restrict the lengths of the input conductive member 75 and the output conductive member 76 from becoming longer as compared with a case where the charging connection portion 42 and the battery connection portion 52 do not overlap. Therefore, in the above configuration, the influence of the power loss due to the conductive member at the time of quick charging of the battery 50 can be reduced.

In the above configuration, as shown in FIG. 4, when the charging connection portion 42 is viewed from the charging connector 40 in one direction, the DCDC converter 21 is located not overlap with the charging connection portion 42 and the battery connection portion 52. With the above configuration, it is possible to restrict the DCDC converter 21 from being arranged between the charging connection portion 42 and the battery connection portion 52.

Contrary to the above configuration, in a case where the DCDC converter 21 is arranged to overlap the charging connection portion 42 and the battery connection portion 52 when the charging connection portion 42 is viewed from the charging connector 40 in one direction, the DCDC converter 21 is arranged between the charging connection portion 42 and the battery connection portion 52. When the DCDC converter 21 is arranged as described above, the input conductive member 75 and the output conductive member 76 may need to extend along the DCDC converter. When the input conductive member 75 or the output conductive member 76 extends along the DCDC converter 21, the length increases by the amount of the extension.

Therefore, in the above configuration, it is possible to restrict the length of the conductive member from becoming longer as compared with a case where the DCDC converter is arranged at a position to overlap with the charging connection portion 42 and the battery connection portion 52. Therefore, in the above configuration, the influence of the power loss due to the conductive member can be reduced at the time of quick charging of the battery 50.

In the above configuration, as shown in FIG. 5, the DCDC converter 21 and the charger 22 are arranged at position not overlap with the charging connection portion 42 and the battery connection portion 52 in the width direction. With the above configuration, the relay 60, the input conductive member 75, and the output conductive member 76 arranged between the charging connection portion 42 and the battery connection portion 52 are suppressed from overlapping with the DCDC converter 21 and the charger 22 in the width direction. Therefore, in the above configuration, it is possible to restrict the relay 60, the input conductive member 75 and the output conductive member 76 from interfering with the DCDC converter 21 and the charger 22, so that the space of the housing 70 can be effectively utilized.

In the above configuration, it is desirable that the charging connection portion 42 and the battery connection portion 52 completely overlap each other when the charging connection portion 42 is viewed from the charging connector 40 in the one direction. According to the above configuration, the distance between the charging connection portion 42 and the battery connection portion 52 is shorter than that in a case where the charging connection portion 42 and the battery connection portion 52 partially overlap with each other. Therefore, in the above configuration, it is possible to more effectively suppress the increase in the distance between the input conductive member 75 and the output conductive member 76. Therefore, in the above configuration, the influence of power loss at the time of quick charging of the battery 50 can be reduced.

Second Embodiment

Figure 6:
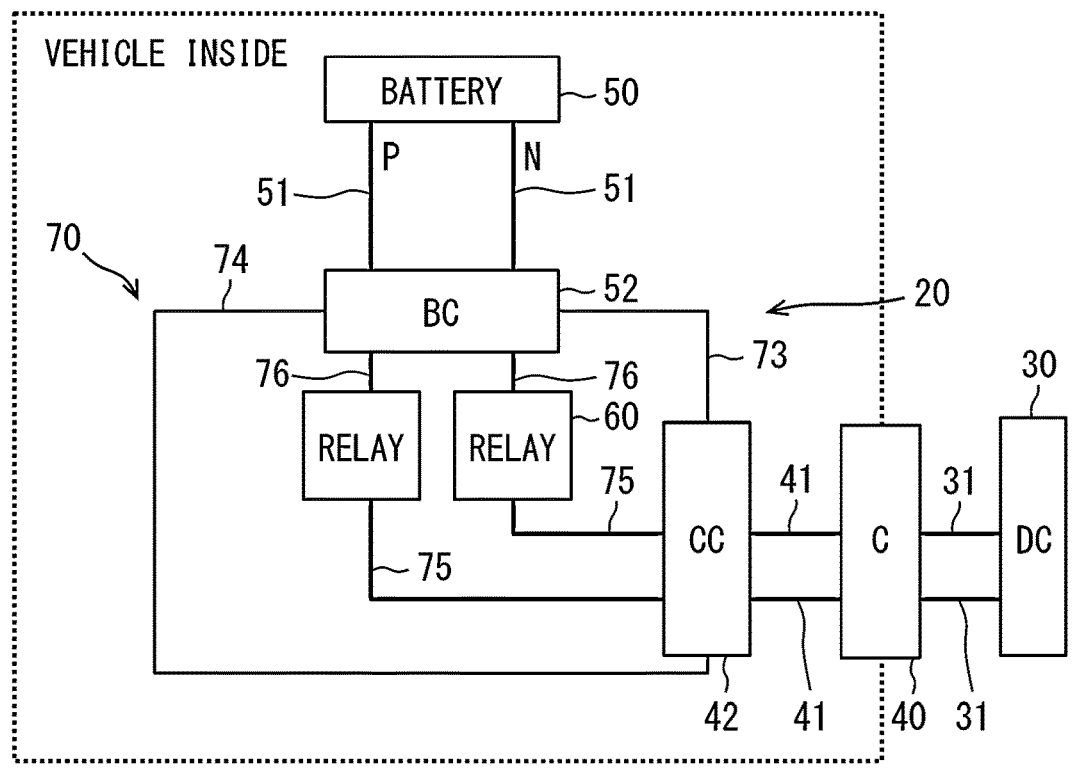
FIG. 6 is a diagram showing a configuration of a charging device according to a second embodiment of the present disclosure.

In the present embodiment, a direction orthogonal to the input surface 73 is defined as the first direction, and a direction orthogonal to the output surface 74 is defined as the second direction. A direction orthogonal to the first direction and the second direction is defined as the third direction. As shown in FIG. 6, the input surface 73 and the output surface 74 are orthogonal to each other. The "orthogonal" indicates a range of 80 degrees to 100 degrees, and does not mean only 90 degrees. More preferably, the angle between the input surface 73 and the output surface 74 is in the range of 85 degrees to 95 degrees.

In the present embodiment, the charging connection portion 42 and the battery connection portion 52 are arranged at positions where at least a part of the charging connection portion 42 and the battery connection portion 52 overlap each other on an axis of the third direction.

Figure 7:
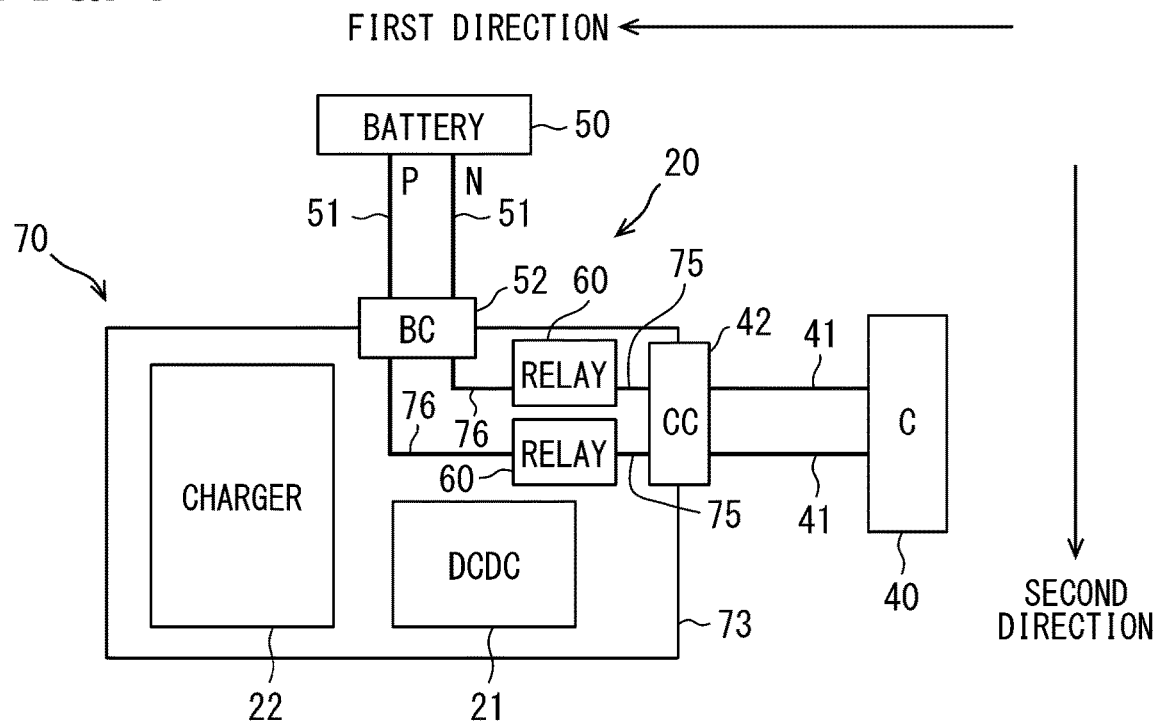
FIG. 7 is a diagram showing a configuration of a charging device according to the second embodiment of the present disclosure.

As shown in FIG. 7, when the charging connection portion 42 is viewed from the charging connector 40 in the first direction, the DCDC converter 21 is arranged at a position not overlap with the charging connection portion 42.

In FIG. 7, when the charging connection portion 42 is viewed from the charging connector 40 in the first direction, the charger 22 is arranged at a position to overlap with the charging connection portion 42, but may be arranged at a position not to overlap with the charging connection portion 42.

In FIG. 7, the charging connection portion 42 is arranged between the output surface 74 and the center of the housing 70 in the second direction. The battery connection portion 52 is arranged between the input surface 73 and the center of the housing 70 in the first direction. When the battery connection portion 52 is viewed from the battery 50 in the second direction, the charger 22 is arranged at a position not overlap with the battery connection portion 52.

In FIG. 7, when the battery connection portion 52 is viewed from the battery 50 in the second direction, the DCDC converter 21 is arranged at a position to overlap with the battery connection portion 52, but may be arranged at a position not overlap with the battery connection portion 52.

In FIG. 6, the charging connector 40 is provided on the fender side, that is, the lateral side of the vehicle. At least a part of the battery 50 is located on the rear side of the vehicle. Further, in the above configuration, a direction in which the charging connector 40 and the charging device 20 face each other and a direction in which the battery 50 and the charging device 20 face each other are orthogonal to each other. In the charging device 20 shown in FIG. 6, the input surface 73 and the output surface 74 of the housing 70 are orthogonal to each other. In the charging device 20 having the above configuration, the charging connection portion 42 can be arranged adjacent to the charging connector 40 with respect to the vehicle. Similarly, in the above configuration, the battery connection portion 52 can be arranged adjacent to the battery 50. Therefore, with the above configuration, it is possible to restrict the lengths of the relay cable 41 and the battery cable 51 from becoming long. Therefore, in the above configuration, the influence of the power loss due to the conductive member can be reduced at the time of quick charging of the battery 50.

In the above configuration, the charge connection portion 42 and the battery connection portion 52 are arranged at positions where at least a part of the charge connection portion 42 and the battery connection portion 52 overlap each other on the axis of the third direction. Therefore, in the above configuration, it is possible to suppress the distance between the charge connection portion 42 and the battery connection portion 52 from increasing, compared with a case where the charging connection portion 42 and the battery connection portion 52 are arranged at positions not overlap each other on the axis of the third direction. Therefore, in the above configuration, it is possible to restrict the distance between the input conductive member 75 and the output conductive member 76 from becoming long. Therefore, in the above configuration, the influence of the power loss due to the conductive member can be reduced at the time of quick charging of the battery 50.

As shown in FIG. 7, in the above configuration, the DCDC converter 21 is arranged at a position not overlap the charging connection portion 42 when the charging connection portion 42 is viewed from the charging connector 40 in the first direction. In the above configuration, it is possible to suppress the DCDC converter 21 from being arranged at the position where the input conductive member 75 and the output conductive member 76 are arranged. Therefore, in the above configuration, it is possible to restrict the distance between the input conductive member 75 and the output conductive member 76 from becoming long by bypassing the DCDC converter 21. Therefore, in the above configuration, the influence of the power loss due to the conductive member can be reduced at the time of quick charging of the battery 50.

As shown in FIG. 7, the charging connection portion 42 is located on the housing 70 between the output surface 74 and the center of the housing 70 in the second direction. The battery connection portion 52 is located between the input surface 73 and the center of the housing 70 in the first direction. With the above configuration, it is possible to restrict the conductive member and the relay 60 from being arranged within the range between the center of the housing 70 and an opposite surface opposite to the input surface 73 in the first direction and between the center of the housing 70 and an opposite surface opposite to the output surface 74 in the second direction, in the housing 70.

The center in the above refers to a geometric center of gravity of the housing 70 when the housing 70 is viewed from the third direction.

In the above configuration, the DCDC converter 21 and the charger 22 can be arranged in the above range. Therefore, in the above configuration, the DCDC converter 21 and the charger 22 are arranged at positions not overlap with the input conductive member 75, the output conductive member 76, and the relay 60. Therefore, the DCDC converter 21 and the charger 22 can be restricted from interfering with the input conductive member 75, the output conductive member 76, and the relay 60. Therefore, with the above configuration, the space can be effectively used while the components arranged in the housing 70 are restricted from interfering with each other.

Other Embodiments

Although the embodiments of the present disclosure have been described above, the present disclosure is not limited to the above-described embodiments, and the following modifications are also included in the technical scope of the present disclosure. Furthermore, various changes can be made within the range that does not deviate from the scope of the present disclosure.

For example, in FIG. 3, the housing 70 in formed in a rectangular shape having a long side and a short side, but may have another shape such as a square that does not have a long side and a short side.

In the first embodiment, the housing 70 is a rectangular parallelepiped, but the surface of the housing 70 may not be flat and may have a shape having irregularities.

The housing 70 in the present disclosure may be integrally molded or may be composed of a plurality of members such as a lid and a box.

In the first embodiment, the charging connection portion 42 is arranged at a position overlapping with the battery connection portion 52 when the charging connection portion 42 is viewed from the charging connector 40 in the one direction, but may be arranged not to overlap with the charging connection portion 42.

In FIG. 4, when the charging connection portion 42 is viewed from the charging connector 40 in the one direction, the charging connection portion 42 is arranged at a position not overlap with the DCDC converter 21 and the charger 22 but may be arranged overlap with the DCDC converter 21 and the charger 22.

In FIG. 5, in the width direction, the charging connection portion 42 and the battery connection portion 52 are arranged at positions not to overlap with the DCDC converter 21 and the charger 22, but may be arranged overlap with the DCDC converter 21 and the charger 22.

In FIG. 7, the charging connection portion 42 is located between the output surface 74 and the center of the housing 70 in the second direction, but may be located at the center or between the center and an opposite surface opposite to the output surface 74.

In FIG. 7, the battery connection portion 52 is located between the input surface 73 and the center of the housing 70 in the first direction, but may be arranged at the center or between the center and an opposite surface opposite to the input surface 73.

In the present disclosure, the DCDC converter 21, the charger 22, and the ECU 23 are housed in the housing 70 of the charging device 20, but may be housed in a housing different from the housing 70.

What is claimed is:
1. A charging device for a vehicle comprising:
a charging connector connected to a power supply cable outside the vehicle;
a relay cable arranged inside the vehicle, the relay cable having one end connected to the charging connector;
a battery charged by a direct current supplied from the charging connector;
a battery cable having one end connected to the battery;
a charging connection portion connected to the other end of the relay cable;
a battery connection portion connected to the other end of the battery cable;
a relay that switches the direct current to be supplied or not relative to the battery; and
a housing arranged between the battery and the charging connector so as to house the relay, wherein
the charging connection portion is arranged on the housing adjacent to the charging connector,
the battery connection portion is arranged on the housing adjacent to the battery,
the housing has two surfaces orthogonal to each other, and
the relay is located adjacent to one of the two surfaces on which the charging connection portion is arranged and adjacent to the other of the two surfaces on which the battery connection portion is arranged.

2. The charging device according to claim 1, wherein
the housing has an input surface on which the charging connection portion is arranged and an output surface on which the battery connection portion is arranged, and the input surface and the output surface are orthogonal to each other.

3. The charging device according to claim 2, wherein
a direction orthogonal to the input surface is defined as a first direction,
a direction orthogonal to the output surface is defined as a second direction,
a direction perpendicular to the first direction and the second direction is defined as a third direction, and
the charging connection portion and the battery connection portion are arranged at positions where the charging connection portion and the battery connection portion at least partially overlap with each other on an axis of the third direction.

4. The charging device according to claim 2, wherein
the housing houses a DCDC converter that converts a voltage of the battery,
the DCDC converter is arranged at a position not overlap with the charging connection portion when the charging connection portion is viewed from the charging connector in a direction orthogonal to the input surface, or
the DCDC converter is arranged at a position not overlap with the battery connection portion when the battery connection portion is viewed from the battery in a direction orthogonal to the output surface.

5. The charging device according to claim 4, wherein
a position where the charging connection portion is attached is located between the output surface and a center of the housing, when the housing is viewed from the charging connector in a direction orthogonal to the input surface, and
a position where the battery connection portion is attached is located between a center of the housing and the input surface, when the housing is viewed from the battery in a direction orthogonal to the output surface.

* * * * *